US011635531B2

(12) United States Patent
Zhao et al.

(10) Patent No.: US 11,635,531 B2
(45) Date of Patent: Apr. 25, 2023

(54) APPARATUS FOR MEASURING PHOTON INFORMATION AND PHOTON MEASUREMENT DEVICE

(71) Applicant: ZHONGPAI S&T (SHENZHEN) CO., LTD, Guangdong (CN)

(72) Inventors: Zhixiang Zhao, Shanghai (CN); Siwei Xie, Wuhan (CN); Jingwu Yang, Shenzhen (CN); Rendong Zhang, Shenzhen (CN); Zheng Gong, Shenzhen (CN); Qiyu Peng, Wuhan (CN)

(73) Assignee: ZHONGPAI S&T (SHENZHEN) CO., LTD, Shenzhen (CN)

( * ) Notice: Subject to any disclaimer, the term of this patent is extended or adjusted under 35 U.S.C. 154(b) by 181 days.

(21) Appl. No.: 17/295,398

(22) PCT Filed: Aug. 26, 2019

(86) PCT No.: PCT/CN2019/102537
§ 371 (c)(1),
(2) Date: May 19, 2021

(87) PCT Pub. No.: WO2020/103509
PCT Pub. Date: May 28, 2020

(65) Prior Publication Data
US 2021/0389479 A1 Dec. 16, 2021

(30) Foreign Application Priority Data
Nov. 20, 2018 (CN) .......................... 201811380936.6

(51) Int. Cl.
*G01T 1/208* (2006.01)
*G01J 1/46* (2006.01)
*G01T 1/202* (2006.01)

(52) U.S. Cl.
CPC ................ *G01T 1/208* (2013.01); *G01J 1/46* (2013.01); *G01T 1/202* (2013.01)

(58) Field of Classification Search
None
See application file for complete search history.

(56) References Cited

U.S. PATENT DOCUMENTS 10,333,516 B2 * 6/2019 Li ........................... H03K 17/78
10,809,395 B2 * 10/2020 Zhao ..................... G01T 1/2985
(Continued)

FOREIGN PATENT DOCUMENTS

CN    104459756 A    3/2015
CN    105022082 A    11/2015
(Continued)

OTHER PUBLICATIONS

International Search Report dated Nov. 29, 2019 in connection with International Application No. PCT/CN2019/102537.

*Primary Examiner* — Edwin C Gunberg
(74) *Attorney, Agent, or Firm* — Wolf, Greenfield & Sacks, P.C.

(57) ABSTRACT

An apparatus for measuring photon information and a photon measurement device are disclosed. The apparatus comprises a signal conversion module for converting an initial signal outputted by the photoelectric sensor into a converted signal in a voltage form, an integral comparison module for integrating a difference between the initial signal and a feedback signal from the negative feedback module and generating a comparison signal based on a magnitude relationship between a reference level and a combination result of an integral signal and the converted signal, wherein the integral signal is a signal for representing an integral of the difference between the initial signal and the feedback signal, a transmission control module for controlling the comparison signal to be transmit based on a clock signal to output (Continued)

a digital signal, a negative feedback module for converting the digital signal into the feedback signal and feeding the feedback signal back to the integral comparison module, and a measurement module for determining, based on the comparison signal and/or the digital signal, an arrival time of a high-energy photon detected by the photoelectric sensor. The apparatus and the device require few circuit components, and can realize high-precision time measurement.

16 Claims, 3 Drawing Sheets

(56) References Cited

U.S. PATENT DOCUMENTS

| | | | | |
|---|---|---|---|---|
| 2005/0134715 | A1* | 6/2005 | Fowler | H04N 25/77 |
| | | | | 348/308 |
| 2006/0027730 | A1* | 2/2006 | Bamji | G01S 17/08 |
| | | | | 348/E3.018 |
| 2008/0011955 | A1 | 1/2008 | Di Bene et al. | |

FOREIGN PATENT DOCUMENTS

| | | |
|---|---|---|
| CN | 105074500 A | 11/2015 |
| CN | 106656390 A | 5/2017 |
| CN | 107450092 A | 12/2017 |
| CN | 109283569 A | 1/2019 |

\* cited by examiner

APPARATUS FOR MEASURING PHOTON INFORMATION AND PHOTON MEASUREMENT DEVICE

CROSS-REFERENCE TO RELATED APPLICATIONS

This application is a 35 U.S.C. § 371 National Phase filing of International Application No. PCT/CN2019/102537, filed on Aug. 26, 2019, which claims priority to and the benefit of Chinese Patent Application No. 201811380936.6, filed on Nov. 20, 2018. The entire contents of these applications are incorporated herein by reference in their entirety.

TECHNICAL FIELD

The present disclosure relates to the field of circuits, in particular to an apparatus for measuring photon information and a photon measurement device.

BACKGROUND

A front-end detecting apparatus of a high-energy photon (X-ray, a gamma photon, etc.) measurement system generally includes a scintillator, a photoelectric detector (or a photoelectric sensor), and a photon measurement front-end circuit. A group of visible photon with low-energy is generated after a high-energy photon interacts with the scintillator. The photoelectric sensor converts an optical signal carried by the group of visible photons into an electric signal. The main purpose of the photon measurement front-end circuit is to obtain energy and arrival time of the high-energy photon by measuring the electric signal generated by the photoelectric sensor. For example, in a Positron Emission Tomography (PET) or a Single Photon Emission Computed Tomography (SPECT) system, a group of visible photons with low-energy is generated after a gamma photon interacts with a scintillator, such as a Lutetium Yttrium Silicate (LYSO) crystal. The photoelectric sensor, such as a Photomultiplier Tube (PMT) or a Silicon Photomultiplier Tube (SiPM), converts an optical signal carried by the group of visible photons into an electric signal. The photon measurement front-end circuit measures the electric signal generated by the photoelectric sensor to obtain energy and arrival time of the gamma photon.

In order to prevent the energy calculated based on an analog-to-digital converter (ADC) sampling from being affected by the starting time of the electric signal outputted by the photoelectric sensor in the prior art, an improved photon measurement front-end circuit is currently proposed, which uses an integral module to integrate the electric signal outputted by the photoelectric sensor, and a pulse signal may be triggered when quantity of electric charge accumulated in the integral module reaches a certain amount. The energy and the arrival time of the high-energy photon may then be obtained based on the pulse signal.

There are following problems in the improved photon measurement front-end circuit which is used to measure the arrival time of the high-energy photon. Research shows that the best time resolution can be obtained by measuring the occurrence time of the first several visible photons when the high-energy photon acts on the scintillator. Therefore, in the improved photon measurement front-end circuit, it is desired to trigger and generate, by setting system parameters, the pulse signal that can be used for time measurement, after the integral module accumulates quantity of electric charge generated by n (e.g. 5) visible photons. However, this method may not obtain the best time resolution, because: (1) most photoelectric sensors such as SiPM have a long response time for a single visible photon, and it may take a longer time for the generated quantity of electric charge to be collected by the integral module. Thus, the waveforms of electric signals generated by a plurality of visible photons may overlap in time. That is, when the integral module has not fully completed the integration of the electric signal generated by the first visible photon, it may have received the electric signal generated by the second visible photon and begun to integrate this electric signal. Therefore, the integral module accumulates the quantity of electric charge generated by the n visible photons and triggers the pulse signal at a time later than the actual occurrence time of the n-th visible photon. For example, when n=5, the trigger time may be the time when a dozen of or even dozens of photons occurs. (2) Under the current technical conditions, dark events frequently occur in the photoelectric sensor such as SiPM. Quantity of electric charge generated by the dark events may be accumulated in the integral module. When the high-energy photon acts on the scintillator, if the integral module has accumulated quantity of electric charge generated by m dark events, the trigger theoretically occurs after the integral module accumulates the quantity of electric charge generated by the (n−m)-th visible photon, not the n-th visible photon. Since the dark events and the high-energy photons are random, the value of m may be evenly distributed within the range of 0 to n−1. Therefore, when the pulse signal used for time measurement is generated, the quantity of electric charge accumulated in the integral module due to the high-energy photon may not be the quantity of electric charge generated by the n visible photons, but may be quantity of electric charge generated by any number of visible photons in the range of 1 to n. That is, the charge baseline for determining the arrival time of the high-energy photon may drift, so compared with the actual arrival time, the measured arrival time may drift. Due to the above reasons, the measurement accuracy may be affected if the improved photon measurement front-end circuit is used to measure the arrival time of the high-energy photon.

Therefore, an apparatus for measuring photon information is required to solve at least some of the above problems in the prior art.

BRIEF SUMMARY

In order to at least partially solve the problems in conventional technology, embodiments of the invention provides an apparatus for measuring photon information and a photon measurement device.

An apparatus for measuring photon information is disclosed according to an aspect of the invention. The apparatus comprises a signal conversion module, an integral comparison module, a transmission control module, a negative feedback module, and a measurement module, wherein the signal conversion module is configured to connect to a photoelectric sensor and convert an initial signal outputted by the photoelectric sensor into a converted signal in a voltage form; the integral comparison module is connected to an output of the negative feedback module and the signal conversion module and is configured to connect to the photoelectric sensor, and the integral comparison module is configured to integrate a difference between the initial signal and a feedback signal from the negative feedback module, and to generate a comparison signal based on a magnitude relationship between a reference level and a combination result of an integral signal and the converted signal, wherein the integral signal is a signal for representing an integral of the difference between the initial signal and the feedback signal; an input of the transmission control module is connected to an output of the integral comparison module, and the transmission control module is configured to control the comparison signal to be transmit based on a clock signal to output a digital signal, wherein a high level in the digital signal and with a duration equal to the cycle of the clock signal represents a first logic level, a low level in the digital signal and with a duration equal to the cycle of the clock signal represents a second logic level; an input of the negative feedback module is connected to an output of the transmission control module, and the negative feedback module is configured to convert the digital signal into the feedback signal and feed the feedback signal back to the integral comparison module; and an input of the measurement module is connected to the output of the integral comparison module and/or the output of the transmission control module, and the measurement module is configured to determine, based on the comparison signal and/or the digital signal, an arrival time of a high-energy photon detected by the photoelectric sensor.

Exemplarily, the integral comparison module comprises an integral module and a comparator, the signal conversion module is further configured to generate a first converted signal based on the initial signal and/or generate a second converted signal based on the initial signal, an input of the integral module is connected to the output of the negative feedback module and is configured to connect to the photoelectric sensor, an output of the integral module is connected to a first input of the comparator or connected to an input of an additional module if the integral comparison module comprises the additional module, the integral module is configured to integrate the difference between the initial signal and the feedback signal, an output of the additional module is connected to the first input of the comparator, and the additional module is configured to perform additional processing on a signal outputted by the integral module and output a processed signal; the comparator is configured to compare a first input signal received from the first input with a second input signal received from the second input to generate the comparison signal, wherein the first input signal is $Ca*Va+Cb1*Vb1$, wherein Va is the integral signal, Ca is an amplification coefficient of Va, Vb1 is the first converted signal, Cb1 is an amplification coefficient of Vb1, Ca is not equal to 0, $Cb1*Vb1$ and $Ca*Va$ have same polarity; the second input signal is $Cb2*Vb2+Vr$, wherein Vb2 is the second converted signal, Cb2 is an amplification coefficient of Vb2, Vr is the reference level, Cb2 and Cb1 are not 0 at the same time, $Cb2*Vb2$ and $Ca*Va$ have inverted polarity; and the combination result is $Ca*Va+Cb1*Vb1-Cb2*Vb2$.

Exemplarily, the integral module comprises an operational amplifier, wherein an inverting input of the operational amplifier is connected to the output of the negative feedback module and is configured to connect to the photoelectric sensor; an output of the signal conversion module is connected to a non-inverting input of the operation amplifier and/or the inverting input of the operational amplifier, and the signal conversion module is configured to output the first converted signal to the non-inverting input of the operational amplifier and/or output the second converted signal to the inverting input of the operational amplifier.

Exemplarily, the additional module comprises a first summation module, an input of the first summation module is connected to the output of the integral module and the output of the signal conversion module, and the first summation module is configured to sum an integral output signal outputted by the integral module and the first converted signal and generate a first summation signal, wherein the integral output signal is $Va+CxVb1$, Cx is an amplification coefficient for amplifying Vb1 by the integral module, and $Cx \geq 0$; and the first input of the comparator is connected to an output of the first summation module, and the first summation signal is the first input signal.

Exemplarily, the first summation module is implemented by a passive summation circuit, a non-inverting summation circuit or an inverting summation circuit.

Exemplarily, the second input of the comparator is configured to receive the reference level as the second input signal.

Exemplarily, the reference level is a ground level, wherein the second input of the comparator is connected to an output of the signal conversion module, and the second input is configured to receive the second converted signal as the second input signal.

Exemplarily, the integral comparison module further comprises a second summation module, an input of the second summation module is connected to an output of the signal conversion module and is configured to receive a primary electrical level, and the second summation module is configured to sum the second converted signal and the primary electrical level and generate a second summation signal, wherein the reference level Vr is $Cri*Vri$, Vri is the primary electrical level, and Cri is an amplification coefficient for amplifying the primary electrical level by the second summation module; and the second input of the comparator is connected to an output of the second summation module, and the second input is configured to receive the second summation signal as the second input signal.

Exemplarily, the second summation module is implemented by a passive summation circuit, a non-inverting summation circuit or an inverting summation circuit.

Exemplarily, the signal conversion module comprises a first conversion module and/or a second conversion module, and the first conversion module and the second conversion module are respectively configured to generate the first converted signal and the second converted signal.

Exemplarily, the first conversion module comprises a first primary conversion module and a first differential module, wherein the first primary conversion module is configured to convert the initial signal into a first primary signal in the voltage form; and the first differential module is configured to differentiate the first primary signal to obtain the first converted signal.

Exemplarily, the second conversion module comprises a second primary conversion module and a second differential module, wherein the second primary conversion module is configured to convert the initial signal into a second primary signal in the voltage form; and the second differential module is configured to differentiate the second primary signal to obtain the second converted signal.

Exemplarily, the measurement module determines the arrival time in the following way: determining an occurrence time of a valid event according to an appearance rule of high levels and low levels in the comparison signal and/or the digital signal, and determining the arrival time according to an appearance time of a first high level or a first low level in the comparison signal within the occurrence time of the valid event and/or an appearance time of a first high level or a first low level in the digital signal within the occurrence time of the valid event.

Exemplarily, the measurement module is further configured to estimate a time drift based on the comparison signal and/or the digital signal and correct the arrival time based on the time drift.

Exemplarily, the measurement module is further configured to perform one or more of energy measurement, dark current measurement, waveform measurement and gain measurement of the high-energy photon based on the comparison signal and/or the digital signal.

A photon measurement device is disclosed according to another aspect of the invention. The device comprises a scintillator, a photoelectric sensor, and the apparatus for measuring photon information described above.

The apparatus for measuring photon information and the photon measurement device according to embodiments of the present invention have a simpler circuit structure and lower hardware cost. The apparatus and device according to the embodiments of the present invention can solve the problem that the time measurement may be inaccurate due to the overlap of the waveform of the initial signal and the baseline drift, and their time performance is better. More accurate time measurement results can be obtained.

A series of simplified concepts are introduced in the brief summary, which will be explained in more detail in embodiments. The key features and the essential technical features of the claimed technical solutions of the invention are in no way limited by the contents of the summary. The scope of protection of the claimed technical solutions is not limited by the summary either.

The advantages and the features of the invention will be described in detail in the following with reference to the accompanying drawings.

BRIEF DESCRIPTION OF THE DRAWINGS

The following accompanying drawings of the present disclosure are a part of the invention to facilitate the understanding thereof. Embodiments of the invention and descriptions thereof are shown in the drawings to interpret the principle of the present invention. In the drawings.

DETAILED DESCRIPTION OF THE DISCLOSURE

Numerous details are provided in the following description to enable a thorough understanding of the invention. However, it can be understood by those skilled in the art that the following description relates only to the preferred embodiments of the invention and that the invention may be practiced without one or more of such details. In addition, to avoid obscuring the invention, some technical features known in the art are not described.

Figure 1:
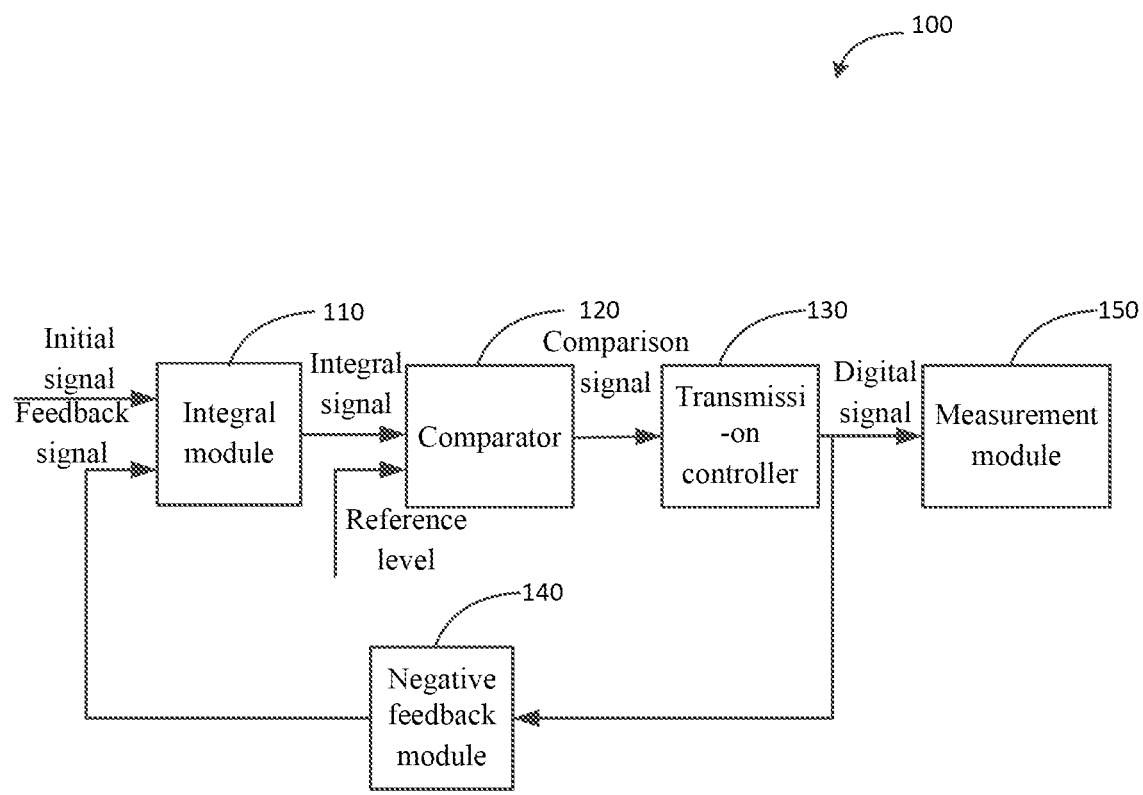
FIG. 1 illustrates a schematic block diagram of an improved photon measurement front-end circuit according to an example.

As described above, in order to prevent the energy calculated by an ADC sampling from being affected by the starting time of the electric signal outputted by the photoelectric sensor in the prior art, an improved photon measurement front-end circuit is currently proposed. FIG. 1 illustrates a schematic block diagram of an improved photon measurement front-end circuit 100 according to an example. It should be noted that the directions of arrows shown in the drawings are the directions of signal transmission, and are not necessarily the directions of signal flow.

As shown in FIG. 1, the improved photon measurement front-end circuit 100 includes an integral module 110, a comparator 120, a transmission controller 130, a negative feedback module 140, and a measurement module 150.

The integral module 110 is configured to connect to an output of a photoelectric sensor (not shown) and an output of the negative feedback module 140. The integral module 110 may receive an initial signal from the photoelectric sensor and a feedback signal from the negative feedback module 140, integrate the difference between the initial signal and the feedback signal and output an integral signal.

An input of the comparator 120 is connected to an output of the integral module 110 and the other input of the comparator 120 is connected to a reference level. The comparator 120 may compare the integral signal with the reference level and generate a comparison signal. For example, when the level value of the integral signal is higher than that of the reference level, the comparator 120 may output a high level; and when the level value of the integral signal is equal to or lower than that of the reference level, the comparator 120 may output a low level. Therefore, the comparison signal outputted by the comparator 120 may only have two states: a high level and a low level.

An input of the transmission controller 130 is connected to an output of the comparator 120. The transmission controller 130 may control the transmission of the comparison signal based on a clock signal to output a digital signal. The high level in the digital signal and with a duration equal to the cycle of the clock signal represents a first logic level, and the low level in the digital signal and with a duration equal to the cycle of the clock signal represents a second logic level. In an example, the first logic level may be the logic level "1", and the second logic level may be the logic level "0". Then the digital signal is a sequence composed of the logic levels "1" and "0".

An input of the negative feedback module 140 is connected to an output of the transmission controller 130, and the negative feedback module 140 may convert the digital signal into a feedback signal and feed the feedback signal back to the integral module 110. The flow direction of the feedback signal is opposite to that of the initial signal.

Understandably, when a valid event or dark event occurs, the integral signal obtained at the beginning is relatively low, the comparison signal and the digital signal may always be at a low level. When the level value of the integral signal is higher than that of the reference level, a high level appears in the comparison signal. Subsequently, a high level also appears in the digital signal. The time that the first high level appears in the comparison signal or the digital signal when the valid event occurs may be used as an arrival time of a high-energy photon. The valid event described herein refers to an event that a current signal is generated in a photoelectric sensor caused by a high-energy photon (such as a gamma photon) acting on a scintillator connected to the photoelectric sensor. The dark event refers to an event that a current signal is generated in a photoelectric sensor due to noise (usually a thermal electron). When the valid event or the dark event occurs, the photoelectric sensor may output a pulse current signal (i.e. the initial signal). The energy of the current signal generated by the valid event is much higher than the energy of the current signal generated by the dark event. The former is usually tens to thousands of times the latter. Therefore, it can be determined that the occurring event is a valid event or a dark event by analyzing the energy of the current signal outputted by the photoelectric sensor.

The measurement module 150 may measure a variety of information such as energy, arrival time and so on of a high-energy photon by using the digital signal.

As described above, the best time resolution can be obtained by measuring the occurrence time of the first several visible photons which are caused by the high-energy photon acting on the scintillator (that is, a valid event occurs). According to the operation principle of the improved photon measurement front-end circuit 100, quantity of electric charge needed to be accumulated in the integral module 110 when the first high level appears in the comparison signal or the digital signal may be controlled by setting the reference level input to the comparator 120. Therefore, it is desired that the best time resolution can be obtained by setting the reference level to be equal to a level value of an integral signal obtained by integrating electric signals generated by n visible photons in the integral module 110. However, due to the two factors described above, this method may be difficult to obtain an ideal time measurement accuracy.

Figure 2:
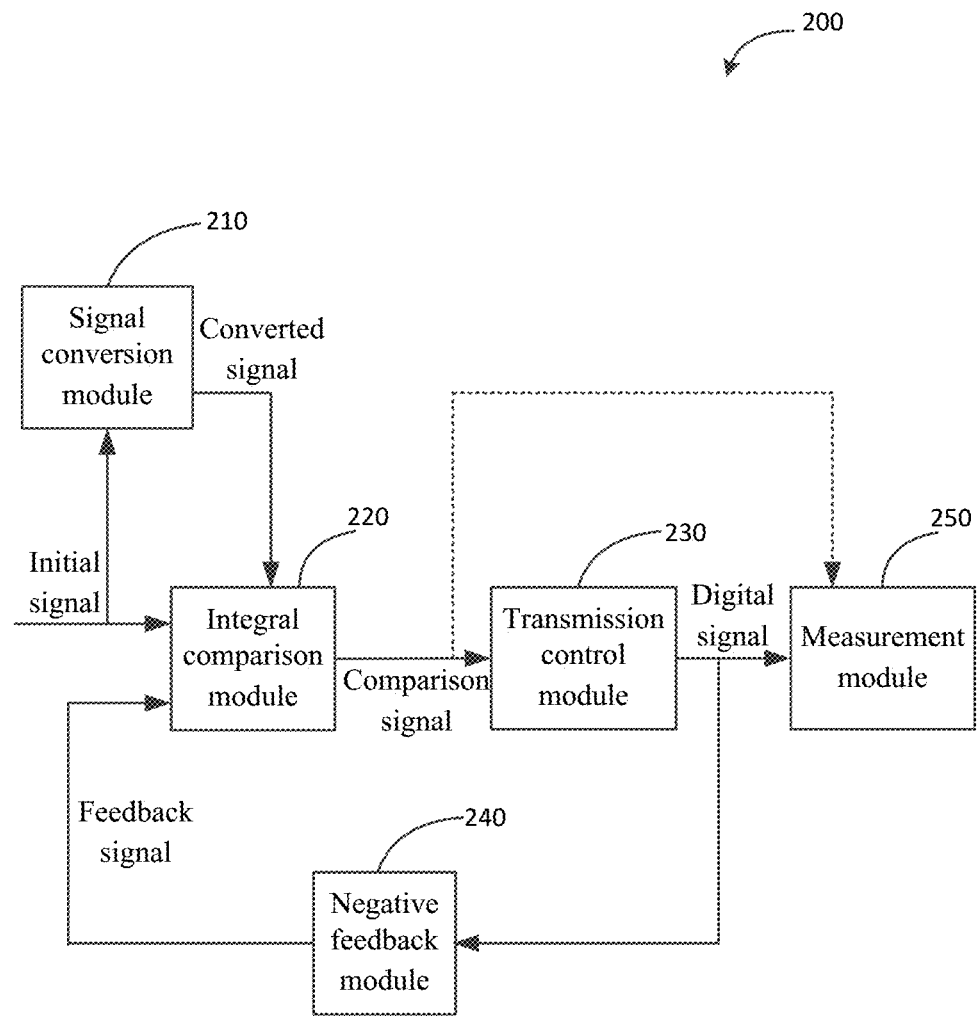
FIG. 2 illustrates a schematic block diagram of an apparatus for measuring photon information according to an embodiment of the present disclosure.

In order to solve the above problem, according to an aspect of the present disclosure, an apparatus for measuring photon information is provided. FIG. 2 illustrates a schematic block diagram of an apparatus 200 for measuring photon information according to an embodiment of the present disclosure.

As shown in FIG. 2, the apparatus 200 includes a signal conversion module 210, an integral comparison module 220, a transmission control module 230, a negative feedback module 240, and a measurement module 250.

The signal conversion module 210 is configured to connect to a photoelectric sensor and convert an initial signal outputted by the photoelectric sensor into a converted signal in a voltage form. In an example, the signal conversion module 210 may be implemented by a resistor. The resistor may be serially connected to a cathode or anode of the photoelectric sensor (such as SiPM). Optionally, the signal conversion module 210 may be implemented by a current limiting resistor usually configured in a SiPM bias circuit.

Optionally, the photoelectric sensor described herein may be any suitable photoelectric sensor, such as SiPM, PMT, an avalanche photodiode (APD) and so on. In addition, the photoelectric sensor described herein may be a photoelectric detection device on various scales such as a sensor microelement, a sensor unit, or a sensor array, and is not limited to a complete independent sensor. It could be appreciated by those skilled in the art that in a PET system, a pair of gamma photons is generated when positron annihilation occurs. When a scintillator is hit by the gamma photons, the photoelectric sensor outputs an initial signal, which is usually a pulse current signal. The photoelectric sensor may output the initial signal to the apparatus 200, so that the apparatus 200 obtains energy information, time information and the like of the gamma photons by measuring the initial signal and then obtains information about the positron annihilation event.

The integral comparison module 220 is connected to an output of the negative feedback module 240 and the signal conversion module 210 and is configured to connect to the photoelectric sensor. The integral comparison module 220 is configured to integrate a difference between the initial signal and a feedback signal from the negative feedback module 240, and to generate a comparison signal based on a magnitude relationship between a reference level and a combination result of the integral signal and the converted signal. The integral signal is a signal for representing an integral of the difference between the initial signal and the feedback signal.

The combination result is a result of combining the integral signal with the converted signal. Illustratively, the combination result may be a sum of the integral signal itself or a corresponding signal obtained by processing, such as amplifying, the integral signal and the converted signal itself or a corresponding signal obtained by processing, such as amplifying, the converted signal. The combination result may also be a difference between the integral signal itself or the corresponding signal obtained by processing, such as amplifying, the integral signal and the converted signal itself or the corresponding signal obtained by processing, such as amplifying, the converted signal. It should be understood that in some cases, the combination result may be a signal actually generated by the circuit. In some other cases, the combination result is a conceptual term that facilitates description, not a signal actually generated.

Illustratively, when the voltage value of the combination result is greater than the reference level, the integral comparison module 220 may output a high level. When the voltage value of the combination result is equal to or less than the reference level, the integral comparison module 220 may output a low level. Therefore, the comparison signal outputted by the integral comparison module 220 may have only two states: the high level and the low level. Generally, the initial signal outputted by the photoelectric sensor is a pulse current signal varying with time. In this example, the integral signal and the converted signal are also signals varying with time. Correspondingly, the combination result is also a signal varying with time. Therefore, the comparison signal outputted by the integral comparison module 220 is a signal switched between the high level and the low level with time. Illustratively, when the voltage value of the combination result is greater than the reference level, the integral comparison module 220 may output a pulse to the transmission control module 230. This pulse is the comparison signal. Optionally, the reference level may be the ground level. The reference level may have any suitable voltage value. The implementation that the reference level is the ground level is simpler, and the final measurement result is more accurate.

An input of the transmission control module 230 is connected to an output of the integral comparison module 220, and the transmission control module 230 is configured to control the comparison signal to be transmit based on a clock signal, to output a digital signal. The high level in the digital signal and with a duration equal to the cycle of the clock signal represents a first logic level, and the low level in the digital signal and with a duration equal to the cycle of the clock signal represents a second logic level.

As described above, the comparison signal may be a signal switched between the high level and the low level with time. In the comparison signal, the durations of the high level and the low level may vary in real time, and cannot be determined. Therefore, the comparison signal may be quantified in time by the transmission control module 230, so that the duration of each continuous high or low level is an integer multiple of the cycle of the clock signal. This quantification in time is equivalent to time discretization during analog-to-digital conversion. In the digital signal outputted by the transmission control module 230, the high level with a duration equal to the cycle of the clock signal represents a first logic level, and the low level with duration equal to the cycle of the clock signal represents a second logic level. In an example, the first logic level may be the logic level "1", the second logic level may be the logic level "0", then the digital signal is a sequence composed of the logic levels "1" and "0". If the frequency of the clock signal is 100 Hz, that is, the cycle of the clock signal is 0.01 s, the duration of a single "1" or "0" is 0.01 s in the digital signal. Further, it could be understood that when a plurality of "1" or "0" continuously appears, the duration of the plurality of "1" or "0" is an integer multiple of 0.01 s. The transmission control module 230 may be a register or a switch circuit controlled by the clock signal.

An input of the negative feedback module 240 is connected to an output of the transmission control module 230, and the negative feedback module 240 is configured to convert the digital signal into a feedback signal and feed the feedback signal back to the integral comparison module 220.

The negative feedback module 240 may include a digital-to-analog converter (DAC) for converting the digital signal into an analog signal. Specifically, the DAC may be a 1-bit DAC to convert the sequence composed of "1" and "0" outputted by the transmission control module 230 into the analog signal, for example, into a voltage signal with magnitude varying with time. The negative feedback module 230 may further include a current output circuit (which may be regarded as a "controlled current source"), for example, a current output circuit including a resistor. The DAC is connected to an input of the integral comparison module 220 via the current output circuit. The current output circuit generates a current signal based on the above-mentioned voltage signal, that is, the feedback signal. The DAC and the current output circuit may be simply implemented by a resistor. The digital signal outputted by the transmission control module 230 is a voltage signal, which may be converted into a current signal by the resistor, i.e., the feedback signal. The feedback signal is opposite to the initial signal in direction, and the accumulations of the feedback signal and the initial signal in the integral comparison module 220 counteract with each other, which can avoid an excessive integral signal to keep the circuit stable. Optionally, the negative feedback module 240 is connected to the measurement module 250. The measurement module 250 may be further configured to adjust the amplitude of the feedback signal outputted by the negative feedback module 240.

If the converted signal is not considered, since the accumulations of the feedback signal and the initial signal counteract with each other, when the pulse duration of the initial signal has ended and the amplitude of the feedback signal has stabilized at zero (that is, the negative feedback for the initial signal has ended), the accumulated value of the feedback signal initiated by the initial signal may be regarded as the accumulated value of the initial signal. The accumulated value of the feedback signal is proportional to the number of "1" in the digital signal. Therefore, the energy of the high-energy photon may be calculated based on the digital signal. Of course, the energy of the high-energy photon may also be calculated based on the comparison signal, and only the same circuit as the transmission control module 230 is required to be added to the subsequent measurement module 250. The amplitude of the feedback signal may be determined according to actual requirements, and the present disclosure does not limit this.

An input of the measurement module 250 is connected to the output of the integral comparison module 220 and/or the output of the transmission control module 230. The measurement module 250 is configured to determine, based on the comparison signal and/or the digital signal, the arrival time of the high-energy photon detected by the photoelectric sensor.

The measurement module 250 may be connected to any one or two of the integral comparison module 220 and the transmission control module 230. In FIG. 2, the connection between the measurement module 250 and the transmission control module 230 is shown by a solid line, and the connection line between the measurement module 250 and the integral comparison module 220 is represented by a dotted line.

The measurement module 250 may include any suitable hardware, software and/or firmware that can measure the arrival time based on the comparison signal and/or the digital signal, such as a time-to-digital converter (TDC). For example, a clock of an Field Programmable Gate Array (FPGA) digital system may be used to directly record the occurrence time of a rising edge (or a falling edge), or a high-precision analog TDC or digital TDC (such as a digital TDC based on an FPGA delay line) may be used to measure the time.

It could be appreciated by those skilled in the art that when a valid event occurs, the corresponding initial signal is a pulse signal with a steeper peak. Compared to the initial signal itself, the slope of the peak of the signal obtained by integrating the initial signal becomes gentle. During a period of time immediately after the valid event occurs, the current value of the feedback signal is a fixed value, such as 0. Therefore, the peak of the integral signal (a signal representing the integral of the difference between the initial signal and the feedback signal) normally occurs later than the peak of the initial signal. The converted signal is a voltage signal converted from the initial signal, and the waveform of the converted signal is substantially consistent with that of the initial signal. Therefore, if the integral signal and the converted signal are separately compared with the same reference level, the integral signal triggers the high level (or low level) in the comparison signal later than the converted signal.

The combination of the integral signal and the converted signal may make the peak occur earlier, and the voltage value of the combined signal may exceed the reference level earlier, thereby triggering the high level (or low level) in the comparison signal. The combination may be addition or subtraction of the integral signal and the converted signal, the two may have same polarity if they are added, and the two may have inverted polarity if they are subtracted. Further, the integral signal and the converted signal may also be added or subtracted after one or two of them being appropriately processed such as amplification. Alternately, after the two are added or subtracted, appropriate processing such as amplification is performed on one or two of them.

The apparatus for measuring photon information according to the embodiment of the present disclosure has at least the following advantages.

(1) Low hardware cost. The circuit structure of the apparatus is simpler and easier to implement. According to the embodiment of the present disclosure, the converted signal is combined with the integral signal such that the desired signal comparison function can be realized by the same comparator. In addition, the combination of the converted signal and the integral signal makes it possible to obtain information such as time information and energy information based on the same signal (for example, the digital signal or comparison signal). Therefore, time measurement and other measurements may be implemented in the same measurement module. The measurement module may be exemplarily implemented by an FPGA to further save hardware cost. Therefore, compared with the solution that time measurement and other measurements are separately implemented by different circuits, the apparatus provided by the embodiment of the present disclosure requires fewer circuit components, and has lower cost, lower power consumption and a smaller size.

(2) High-precision time measurement. The converted signal participates in the comparison process with the reference level, and the arrival time of the high-energy photon is identified by the peak of the combination result of the integral signal and the converted signal, so that the apparatus can respond to the occurrence of the high-energy photon more quickly and more sensitively. Therefore, compared with the improved photon measurement front-end circuit, the apparatus according to the embodiment of the present disclosure can solve the problem of inaccurate time measurement due to the waveform overlap and baseline drift of the initial signal, so the apparatus has better time performance and can obtain more accurate time measurement results.

(3) The time measurement does not substantially affect other measurements of energy, gain and the like. There is a steep peak in the converted signal to assist in identifying the arrival time of the high-energy photon, but the area surrounded by the signal envelope of the converted signal is much smaller than that of the integral signal. Therefore, the combination of the converted signal and the integral signal does not affect the measurement precision of energy and the like of the high-energy photon.

The apparatus for measuring photon information described herein may be implemented by a discrete component circuit, an application specific integrated circuit (ASIC), a programmable component circuit (digital signal processor (DSP) or FPGA) and the like.

According to an embodiment of the present disclosure, the integral comparison module 220 may include an integral module and a comparator. The signal conversion module 210 may be further configured to generate a first converted signal based on the initial signal and/or generate a second converted signal based on the initial signal. An input of the integral module is connected to the output of the negative feedback module 240 and is configured to connect to the photoelectric sensor. An output of the integral module is connected to a first input of the comparator or connected to an input of an additional module if the integral comparison module 220 includes the additional module. The integral module is configured to integrate the difference between the initial signal and the feedback signal. An output of the additional module is connected to the first input of the comparator, and the additional module is configured to perform additional processing on a signal outputted by the integral module and output a processed signal. The comparator is configured to compare a first input signal received from the first input with a second input signal received from the second input to generate the comparison signal. The first input signal is $C_a*V_a+C_{b1}*V_{b1}$, wherein $V_a$ is the integral signal, $C_a$ is an amplification coefficient of $V_a$, $V_{b1}$ is the first converted signal, $C_{b1}$ is an amplification coefficient of $V_{b1}$, $C_a$ is not 0, $C_{b1}*V_{b1}$ and $C_a*V_a$ have same polarity. The second input signal is $C_{b2}*V_{b2}+V_r$, wherein $V_{b2}$ is the second converted signal, $C_{b2}$ is an amplification coefficient of $V_{b2}$, $V_r$ is the reference level, $C_{b2}$ and $C_{b1}$ are not 0 at the same time, $C_{b2}*V_{b2}$ and $C_a*V_a$ have inverted polarity. The combination result is $C_a*V_a+C_{b1}*V_{b1}-C_{b2}*V_{b2}$.

Figure 3:
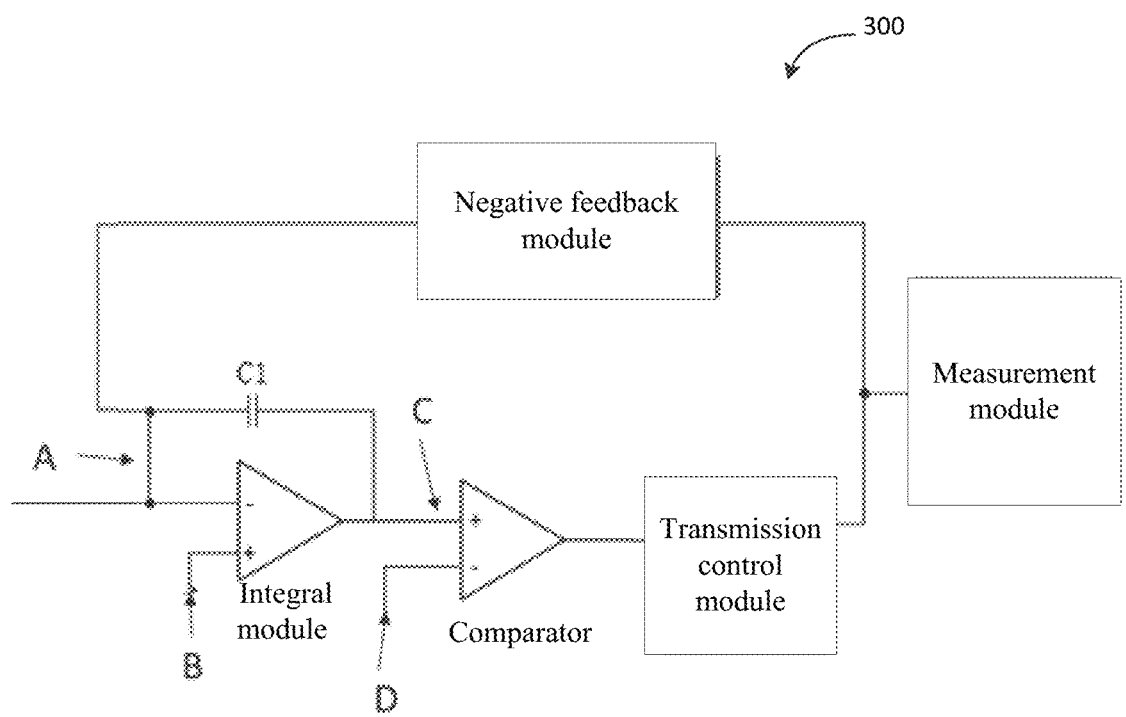
FIG. 3 illustrates a schematic diagram of some circuit components in an apparatus for measuring photon information according to an embodiment of the present disclosure.

FIG. 3 illustrates a schematic diagram of some circuit components in an apparatus 300 for measuring photon information according to an embodiment of the present disclosure. FIG. 3 shows an integral module (represented by an exemplary circuit including an operational amplifier and a capacitor), a comparator, a transmission control module, a negative feedback module and a measurement module in the apparatus 300. FIG. 3 does not show a signal conversion module in the apparatus 300 and additional modules that may be included therein.

The comparator may be implemented by a conventional voltage comparator. Exemplarily, the comparator may be implemented by an FPGA, and its input may be input pins of the FPGA for a pair of low voltage differential signals (LVDS). Further, the measurement module 250 may also be implemented by an FPGA. Modules or devices may be implemented by different FPGAs or the same FPGA.

According to the improved principle described above, before the comparator compares signals, the converted signal is combined with the integral signal such that it is the combination result of these two that is actually compared with the reference level in the comparator. Illustratively, the processing related to the converted signal may be performed at any of four positions A, B, C and D shown in FIG. 3, so that the integral signal may be combined with the converted signal. Accordingly, the output of the signal conversion module 210 may be connected to the input of the integral module, or connected to the input of the additional module (which may be referred as a first additional module) together with the integral module. Alternately, the output of the signal conversion module 210 may be connected to the second input of the comparator, or connected to other additional module together with the reference level if the integral comparison module includes the other additional module (which may be referred as a second additional module). Illustratively but not restrictively, the first additional module may be an amplification module for amplifying the integral signal. The first additional module may be a summation module, which is connected to the integral module and the signal conversion module for summing the integral signal and the first converted signal. Illustratively but not restrictively, the second additional module may be a summation module, which is connected to the signal conversion module, receives the reference level (or a primary electrical level described below), and is configured to sum the second converted signal and the reference level (or the primary electrical level). These examples will be described in detail below.

Regardless of which signal combination method is used, the final result is that the signal(s) received by one or both of the two inputs of the comparator includes a component of the converted signal. For the two inputs of the comparator, the first input signal may be $C_a*V_a+C_{b1}*V_{b1}$, and the second input signal may be $C_{b2}*V_{b2}+V_r$. $C_a$, $C_{b1}$ and $C_{b2}$ are amplification coefficients (or magnification times) of respective signals. The amplification coefficient refers to a ratio of the magnitude of a signal amplified by an intermediate circuit(s) after generated and before inputted to the comparator to the original magnitude of the signal. It could be appreciated by those skilled in the art that the amplification coefficient is not necessarily greater than 1, and it may also be less than or equal to 1. Of course, $C_a$, $C_{b1}$ and $C_{b2}$ may be greater than 0 or less than 0. For example, If $C_a$ is less than 0, $C_a*V_a$ and $V_a$ have inverted polarity.

The converted signal described herein may include a first converted signal and/or a second converted signal. In an example, the first converted signal and the second converted signal may have inverted polarity signals with equal magnitude. When they are combined with converted signals at different positions, the converted signals may be required to have inverted polarity, so the first converted signal and/or the second converted signal may be generated as required.

The process that the comparator compares the signals received by the two inputs may be interpreted as a process of subtracting the two signals. That is, the following operation is performed: $C_a*V_a+C_{b1}*V_{b1}-C_{b2}*V_{b2}-V_r$. $C_{b1}*V_{b1}$ and $C_a*V_a$ have same polarity. So on the whole, the first converted signal has a positive growth effect on the integral signal, not a negative cancellation effect. For the second converted signal, $C_{b2}*V_{b2}$ and $C_a*V_a$ may have inverted polarity. So on the whole, the second converted signal also has a positive growth effect on the integral signal. The comparison implemented by the comparator may be considered to compare $C_a*V_a+C_{b1}*V_{b1}-C_{b2}*V_{b2}$ with the reference level $V_r$, wherein $C_a*V_a+C_{b1}*V_{b1}-C_{b2}*V_{b2}$ is the combination result described above.

As the signal received by at least one input of the comparator includes a component of the converted signal, the combination result of the converted signal and the integral signal may participate in the signal comparison process. There are many ways to combine the converted signal before it is inputted to the comparator, and this combination may be implemented without complex circuitry. Several exemplary implementations of combination of the converted signal will be described below.

According to an embodiment of the present disclosure, the integral module includes an operational amplifier. An inverting input of the operational amplifier is connected to the output of the negative feedback module 210 and is configured to connect to the photoelectric sensor. An output of the signal conversion module 220 is connected to a non-inverting input of the operation amplifier and/or the inverting input of the operational amplifier. The signal conversion module 210 is configured to output the first converted signal to the non-inverting input of the operational amplifier and/or output the second converted signal to the inverting input of the operational amplifier.

Referring to FIG. 3, the integral module may be implemented by an integrating circuit including an operational amplifier, a capacitor and other components. In this example, the converted signal may be combined at at least one of point A and point B.

If the combination point is only at the inverting input (marked as A) of the operational amplifier in FIG. 3, the integral output signal outputted by the integral module is $V_a+C_A*V_{b1}$ ($C_A$ is an amplification coefficient related to circuit parameter settings). $V_a$ and $V_{b1}$ are required to have same polarity here. In this example, $C_a$ is equal to 1, $C_{b1}$ is equal to $C_A$, and $C_{b2}$ is equal to 0. If the converted signal is also introduced at other points or some additional amplification processing is performed on the converted signal and/or the integral signal, the values of $C_a$, $C_{b1}$ and $C_{b2}$ change correspondingly.

If the combination point is only at the non-inverting input (marked as B) of the operational amplifier in FIG. 3, the integral output signal outputted by the integral module is $V_a-C_B*V_{b2}$ ($C_B$ is an amplification coefficient related to circuit parameter settings). $V_a$ and $V_{b2}$ are required to have inverted polarity here. In this example, $C_a$ is equal to 1, $C_{b1}$ is equal to 0, and $C_{b2}$ is equal to $C_B$. If the converted signal is also introduced at other points or some additional amplification processing is performed on the converted signal and/or the integral signal, the values of $C_a$, $C_{b1}$ and $C_{b2}$ change correspondingly.

From the embodiment wherein the combination point is at point A or point B, it may be seen that the signal outputted by the integral module is not necessarily equal to the integral signal $V_a$. Thus, similar to the combination result, the integral signal may be a signal actually generated by the circuit in some cases. In some other cases, the integral signal is a conceptual term that facilitates description, not a signal actually generated.

According to another embodiment of the present disclosure, the additional module (i.e., the first additional module) may include a first summation module. An input of the first summation module is connected to the output of the integral module and the output of the signal conversion module. The first summation module is configured to sum an integral output signal outputted by the integral module and the first converted signal and generate a first summation signal. The integral output signal is $V_a+C_x V_{b1}$, wherein $C_x$ is an amplification coefficient for amplifying $V_{b1}$ by the integral module, and $C_x \geq 0$. The first input of the comparator is connected to an output of the first summation module, and the first summation signal is the first input signal.

If the combination point is only at the output (marked as C, also a non-inverting input of the comparator) of the integral module in FIG. 3, the first input signal received by the comparator is $V_a+C_C*V_{b1}$ ($C_C$ is an amplification coefficient related to circuit parameter settings). $V_a$ and $V_{b1}$ are required to have same polarity here. In this example, $C_a$ is equal to 1, $C_{b1}$ is equal to $C_C$, and $C_{b2}$ is equal to 0. If the converted signal is also introduced at other points or some additional amplification processing is performed on the converted signal and/or the integral signal, the values of $C_a$, $C_{b1}$ and $C_{b2}$ change correspondingly.

Understandably, if the signal conversion module is not connected to the input (i.e., points A and B) of the integral module, the integral output signal is $V_a$. That is, $C_x$ is equal to 0. If the converted signal is combined at point A and/or point B, $C_x$ is not equal to 0.

It should be understood that the connections of the non-inverting input and the inverting input of the comparator shown in FIG. 3 are merely exemplary but not restrictive, and the connections of the two inputs to other components may be interchanged according to the requirements.

Understandably, the first summation module may appropriately amplify the integral output signal and the first converted signal when summing the two. That is, the magnitude of the first summation signal outputted by the first summation module may be equal to the weighted sum of the magnitude of the integral output signal and the magnitude of the first converted signal, and the weights of the two signals may be arbitrary and are not limited to equal to 1.

Exemplarily, the first summation module may be implemented by a passive summation circuit, a non-inverting summation circuit or an inverting summation circuit. The first summation module may be implemented by any suitable existing or future summation circuit. For example, the first summation module may be the simplest passive summation circuit (including one or more resistors), or may also be an active non-inverting amplification summation circuit or an active inverting amplification summation circuit including an amplifier. Exemplarily, the first summation module may be integrated with the signal conversion module 210 (mainly with the first conversion module), and one or more passive electronic components (resistors, capacitors, inductors, etc.) or one or more active amplifiers are used, to simultaneously realize the functions of conversion from a current signal to a voltage signal and summation of signals. Further, in the example that the signal conversion module 210 includes a first differential module as described below, one or more passive electronic components (resistors, capacitors, inductors, etc.), or one or more active amplifiers, may be used to simultaneously realize the functions of conversion from a current signal to a voltage signal, differential calculation of signals and summation of signals.

Illustratively, the second input of the comparator is configured to receive the reference level as the second input signal. In the embodiments that the combination of the converted signal is performed at one or more positions of points A, B and C, the reference level may be connected to point D by conventional means. Of course, the converted signal may also be combined at point D, as described in the following embodiment.

According to another embodiment of the present disclosure, the reference level is a ground level. The second input of the comparator is connected to the output of the signal conversion module, and the second input is configured to receive the second converted signal as the second input signal.

In the example that the reference level is the ground level, the second converted signal may be directly inputted to the second input of the comparator. That is, the signal conversion module may be directly connected to the second input of the comparator without any additional module therebetween. Understandably, this embodiment requires fewer circuit components, and has a lower implementation cost.

If the combination point is only at the inverting input (marked as D, also a reference level input of the comparator) of the comparator in FIG. 3, the difference between the signals of the two inputs of the comparator is $V_a - C_D * V_{b2}$ ($C_D$ is an amplification coefficient related to circuit parameter settings). $V_a$ and $V_{b2}$ are required to have inverted polarity here. In this example, $C_a$ is equal to 1, $C_{b1}$ is equal to 0, and $C_{b2}$ is equal to $C_D$. If the converted signal is also introduced at other points or some additional amplification processing is performed on the converted signal and/or the integral signal, the values of $C_a$, $C_{b1}$ and $C_{b2}$ change correspondingly.

According to another embodiment of the present disclosure, the integral comparison module 220 may further include a second summation module. An input of the second summation module is connected to the output of the signal conversion module 210 and is configured to receive a primary electrical level. The second summation module is configured to sum the second converted signal and the primary electrical level and generate a second summation signal. The reference level $V_r$ is $C_{ri} * V_{ri}$, wherein $V_{ri}$ is the primary electrical level, and $C_{ri}$ is an amplification coefficient for amplifying the primary electrical level by the second summation module. The second input of the comparator is connected to an output of the second summation module, and the second input is configured to receive the second summation signal as the second input signal.

If the reference level is not the ground level, the second converted signal and the primary electrical level (which is the reference level after additional processing such as amplification) may be summed and then inputted to the comparator. The second converted signal and the primary electrical level may be summed by the second summation module. The second summation module is similar to the first summation module, and details thereof will not be described again.

Illustratively, if the weights of both the second converted signal and the primary electrical level are 1 during summation, that is, the two are simply added without being amplified, then the reference level is equal to the primary electrical level. If the primary electrical level is amplified by a certain proportion during summation, the reference level is equal to the product of the primary electrical level and its amplification proportion. That is, in the latter example, the reference level involved in signal comparison is not directly inputted to the first summation module.

Exemplarily, the second summation module may be implemented by a passive summation circuit, a non-inverting summation circuit or an inverting summation circuit. The second summation module may be implemented by any suitable existing or future summation circuit. For example, the second summation module may be the simplest passive summation circuit (including one or more resistors), or may also be an active non-inverting amplification summation circuit or an active inverting amplification summation circuit including an amplifier. Exemplarily, the second summation module may be integrated with the signal conversion module 210 (mainly with the second conversion module), and one or more passive electronic components (resistors, capacitors, inductors, etc.) or one or more active amplifiers are used, to simultaneously realize the functions of conversion from a current signal to a voltage signal and summation of signals. Further, in the example that the signal conversion module 210 includes a second differential module as described below, one or more passive electronic components (resistors, capacitors, inductors, etc.), or one or more active amplifiers, may be used to simultaneously realize the functions of conversion from a current signal to a voltage signal, differential calculation of signals and summation of signals.

Optionally, the combination of the converted signal may be implemented at two, three or four of the above-mentioned four positions A, B, C and D, which can improve the magnitude of the converted signal in the combination result, and further improve the time measurement accuracy of the high-energy photon. Thus, there is a total of at least 4 (single position)+6 (two positions)+4 (3 positions)+1 (all 4 positions)=15 combinations. Therefore, there are at least 15 different circuit implementations. The present disclosure covers all the 15 implementations.

According to an embodiment of the present disclosure, the signal conversion module 210 may include a first conversion module and/or a second conversion module. The first conversion module and the second conversion module are respectively configured to generate the first converted signal and the second converted signal.

The first conversion module and the second conversion module may respectively generate a first converted signal and a second converted signal which have inverted polarity. In an example, the first conversion module and the second conversion module may be mutually independent modules. In another example, the first conversion module and the second conversion module may be connected to each other. The first conversion module may process the second converted signal generated by the second conversion module to invert it, thereby obtaining the first converted signal. Similarly, the second conversion module may also process the first converted signal generated by the first conversion module to invert it, thereby obtaining the second converted signal.

In an example, the first conversion module may be implemented by a resistor, and the resistor may be serially connected to the cathode or anode of the photoelectric sensor (such as SiPM). Similarly, the second conversion module may also be implemented by a resistor, and the resistor may also be serially connected to the cathode or anode of the photoelectric sensor (such as SiPM).

According to an embodiment of the present disclosure, the first conversion module may include a first primary conversion module and a first differential module. The first primary conversion module is configured to convert the initial signal into a first primary signal in voltage form. The first differential module is configured to differentiate the first primary signal to obtain the first converted signal.

In an example, the first differential module may include a first differentiator. Illustratively, the first differentiator may be implemented by a high-pass filter including a capacitor and a resistor. In an example, the first differential module may include only a first differentiator. The first differentiator is configured to differentiate the first primary signal and output the above-mentioned first differential signal. The implementation circuit of this differential module is simpler, and this implementation may be employed if the magnitude of the signal outputted by the first differentiator meets the requirements. In another example, the first differential module may further include a first amplifying circuit. An input of the first amplifying circuit is connected to an output of the first differentiator. The first differentiator is configured to differentiate the first primary signal and output a first primary differential signal, and the first amplifying circuit is configured to amplify the first primary differential signal to obtain the first differential signal. If the signal outputted by the first differentiator is too low to meet the requirements, the signal outputted by the first differentiator may be amplified by the first amplifying circuit, so that the amplified signal is high enough to be used for measuring the arrival time of the high-energy photon correctly.

Figure 4:
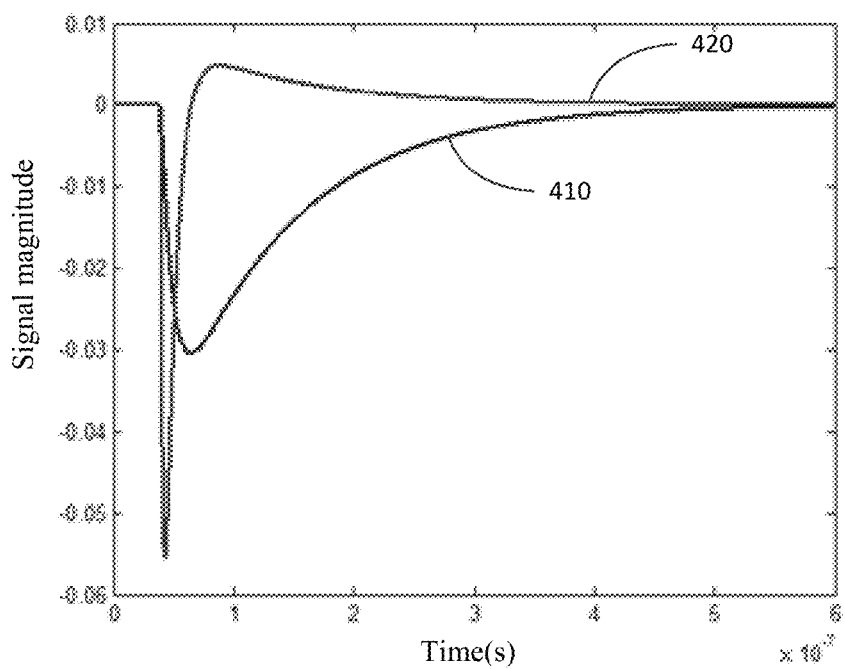
FIG. 4 illustrates a schematic waveform diagram of a first differential signal and a voltage signal (a first primary signal) corresponding to an initial signal according to an embodiment of the present disclosure.

FIG. 4 illustrates a schematic waveform diagram of a voltage signal (a first primary signal) corresponding to an initial signal and a first differential signal according to an embodiment of the present disclosure. In FIG. 4, the waveform 410 represents the waveform of the first primary signal, and the waveform 420 represents the waveform of the first differential signal. It can be seen from FIG. 4 that the first differential module extracts a high-frequency component of the first primary signal, so that the slope of a pulse leading edge (a falling edge) of the first differential signal is much larger than the slope of a pulse leading edge (a falling edge) of the first primary signal. Therefore, compared with the combination of the simply voltage-converted signal and the integral signal, the combination result of the differential signal and the integral signal becomes steeper. Therefore, when a valid event occurs, the response of the combination result of the differential signal and the integral signal is more sensitive than that of the combination result of the simply voltage-converted signal and the integral signal. So the appearance of the high-energy photon can be detected more timely and more accurate time measurement results can be obtained. In addition, the differential module has a strong ability to suppress baseline drift, which is also advantageous to obtain higher time measurement accuracy.

According to an embodiment of the present disclosure, the second conversion module may include a second primary conversion module and a second differential module. The second primary conversion module is configured to convert the initial signal into a second primary signal in the voltage form. The second differential module is configured to differentiate the second primary signal to obtain the second converted signal.

In an example, the second differential module may include a second differentiator. Illustratively, the second differentiator may be implemented by a high-pass filter including a capacitor and a resistor. In an example, the second differential module may include only a second differentiator. The second differentiator is configured to differentiate the second primary signal and output the above-mentioned second differential signal. The implementation circuit of this differential module is simpler, and this implementation may be employed if the magnitude of the signal outputted by the second differentiator meets the requirements. In another example, the second differential module may further include a second amplifying circuit. An input of the second amplifying circuit is connected to an output of the second differentiator. The second differentiator is configured to differentiate the second primary signal and output a second primary differential signal, and the second amplifying circuit is configured to amplify the second primary differential signal to obtain the second differential signal. If the signal outputted by the second differentiator is too low to meet the requirements, the signal outputted by the second differentiator may be amplified by the second amplifying circuit, so that the amplified signal is high enough to be used for measuring the arrival time of the high-energy photon correctly.

The implementation principle and advantages of this embodiment are similar to those of the previous embodiment, and details are not described herein again.

Exemplarily, the measurement module 250 may determine the arrival time in the following way: determining an occurrence time of a valid event according to an appearance rule of high levels and low levels in the comparison signal and/or the digital signal, and determining the arrival time according to an appearance time of the first high level or first low level in the comparison signal within the occurrence time of the valid event and/or an appearance time of the first high level or first low level in the digital signal within the occurrence time of the valid event.

The time measurement function of the measurement module 250 (and other functions such as energy measurement) may be implemented by measuring the comparison signal outputted by the integral comparison module 220, or by measuring the digital signal outputted by the transmission control module 230, or by simultaneously measuring the comparison signal and the digital signal and then performing weighted averaging or other algorithms on the two.

The energy of the current signal generated by the valid event is much greater than the energy of the current signal generated by the dark event. If the appearance time of the high level in the comparison signal and the appearance time (number) of the high level or the first logic level in the digital signal are positively correlated to the energy of an optical signal detected by the photoelectric sensor, the appearance time of the high level in the comparison signal and the appearance time of the high level in the digital signal when the valid event occurs is much longer than those when the dark event occurs. Therefore, the valid event and the dark event can be distinguished very easily. When it is determined that the valid event occurs, the appearance time of the first rising edge in the comparison signal and/or the appearance time of the first rising edge in the digital signal within the occurrence time of the valid event can be found. Any appearance time described above may be regarded as the arrival time of the high-energy photon. The arrival time of the high-energy photon may also be determined by simultaneously referring to the two appearance times.

The determination method of the arrival time will be described below, taking the digital signal as an example. Illustratively, the measurement module 250 may determine the arrival time of the high-energy photon in the following way: determining a valid trigger time according to an appearance rule of high levels and low levels in the digital signal, and using the valid trigger time as the arrival time, wherein the valid trigger time is the time for the valid event to trigger a high level in the digital signal. In an example, the valid trigger time may be the time for the digital signal to transition from a low level to a high level triggered by the valid event, that is, a rising edge. In another example, the valid trigger time may be the time for the digital signal to transition from a high level to a low level triggered by the valid event, that is, a falling edge. In yet another example, the valid trigger time may be any moment in the duration of a high level triggered by the valid event.

As described above, the digital signal may be a sequence composed of logic levels "1" and "0". In this case, the appearance of the first logic level "1" in the digital signal may be considered to be triggered by a valid event or a dark event. A visible photon and a dark event produce the same initial signal in the photoelectric sensor. Since a high-energy photon may initiate a large number of visible photons, the energy generated by each valid event is much greater than the energy generated by each dark event. However, the frequency of dark events is higher than the frequency of valid events. When no valid event occurs, scattered "1" may appear in the digital signal due to the presence of a dark event. When a valid event occurs, a large number of "1" may appear in the digital signal within a short time. Therefore, whether a valid event occurs may be determined according to the appearance rule of high levels and low levels in the digital signal. When it is determined that no valid event occurs, the time of appearance or end of each "1" or any time in the period from its appearance to its end may be regarded as a time for a dark event to trigger a high level in the digital signal, that is, a dark trigger time. When it is determined that a valid event occurs, the time of appearance or end of the first "1" caused by the valid event or any time in the period from its appearance to its end may be regarded as a time for the valid event to trigger a high level in the digital signal, that is, a valid trigger time. In this way, the valid trigger time and/or the dark trigger time may be determined according to the appearance rule of high levels and low levels in the digital signal.

According to an embodiment of the present disclosure, the measurement module 250 may further be configured to estimate a time drift based on the comparison signal and/or the digital signal and correct the arrival time based on the time drift.

The estimation method of the time drift will be described below, also taking the digital signal as an example. The estimating method of the time drift with the comparison signal is similar, and details are not described herein again. Exemplarily, the measurement module 250 may estimate the time drift in the following way: determining a previous dark trigger time prior to a valid trigger time according to the appearance rule of high levels and low levels in the digital signal, wherein the dark trigger time is a time for a dark event to trigger a high level in the digital signal; calculating a time interval between the valid trigger time and the previous dark trigger time; estimating an amount of dark events that occur within the time interval; and estimating the time drift according to the amount of dark events that occur within the time interval.

In an example, the dark trigger time may be a time for the digital signal to transition from a low level to a high level triggered by a dark event, that is, a rising edge. In another example, the dark trigger time may be a time for the digital signal to transition from a high level to a low level triggered by the dark event, that is, a falling edge. In yet another example, the dark trigger time may be any moment in the duration of a high level triggered by a dark event.

The occurrence of dark events has a certain frequent. The amount of dark events within the time interval between the valid trigger time and the previous dark trigger time may be estimated according to the time interval and the frequency of the dark events. The amount of dark events may be any indicator capable of measuring how many dark events occur, such as the number of dark events, the quantity of charge of the dark events or the energy of the dark events. For example, if the time interval between the valid trigger time and the previous dark trigger time is 50 nanoseconds and a dark event occurs once every 10 nanoseconds, then five dark events may occur within 50 nanoseconds. How much the arrival time drifts due to the accumulation of the quantity of electric charge generated by five dark events in the integral module may be estimated according to the experience or theoretical calculation (that is, the time drift is estimated). Subsequently, the arrival time can be corrected based on the time drift.

According to this embodiment, the time drift is estimated and the arrival time is corrected based on the time drift, which can correct the time measurement error caused by the dark events, to further improve the time measurement accuracy of the apparatus.

According to an embodiment of the present disclosure, the measurement module 250 may also be configured to perform one or more of energy measurement of the high-energy photon, dark current measurement, waveform measurement and gain measurement, based on the comparison signal and/or the digital signal.

In addition to the time measurement, the measurement module 250 may also perform other desired measurements based on the comparison signal and/or the digital signal. The desired measurements include energy measurement, dark current measurement, waveform measurement, gain measurement, and the like.

For example, the digital signal includes energy information, which may reflect the energy of the high-energy photon detected by the photoelectric sensor. The measurement module 250 may calculate or infer the energy of the high-energy photon by performing some operations (such as summation) on the digital signal. Understandably, the measurement module 250 may obtain a relative value of the energy of the high-energy photon from the digital signal. The relative value can represent an exact value of the energy of the high-energy photon. In addition, the measurement module 250 may include the same circuit as the transmission control module, and this circuit is connected to the output of the integral comparison module 220. The circuit processes the comparison signal to output a signal same to the digital signal. The measurement module 250 then measures the energy of the high-energy photon based on the signal. Its calculation process is the same as the process of calculation directly based on the digital signal, and details are not described herein again.

The measurement module 250 may include an energy measurement module. The energy measurement module may be connected to the output(s) of the integral comparison module 220 and/or the transmission control module 230 to measure energy based on the comparison signal and/or the digital signal. Optionally, the energy measurement module may include a counter (not shown) for counting first logic levels to measure the energy of the high-energy photon. That is, the energy may be measured by counting the number of "1" in the digital signal. Optionally, the energy measurement module may include an adder (not shown) for summing the first logic levels to measure the energy of the high-energy photon. That is, "1" in the digital signal may be directly added, and the sum is the energy of the high-energy photon. The method of measuring energy by counting or summing the first logic levels is simple, fast and efficient.

The measurement module 250 may include a dark current measurement module. Similar to the energy measurement module, the dark current measurement module may be connected to the output(s) of the integral comparison module 220 and/or the transmission control module 230 to measure dark current based on the comparison signal and/or the digital signal. For example, the dark current measurement module may perform an operation on the digital signal from the transmission control module 230 to measure the dark current. For example, the magnitude of the dark current may be measured by calculating the number of "1" in the digital signal per unit time when no valid event occurs. The magnitude of the dark current is directly proportional to the number of "1" in the digital signal per unit time.

The measurement module 250 may include a waveform measurement module. Similar to the energy measurement module and the dark current measurement module, the waveform measurement module may be connected to the output(s) of the integral comparison module 220 and/or the transmission control module 230 to perform waveform reconstruction and waveform measurement on the initial signal based on the comparison signal and/or the digital signal. For example, the waveform measurement module may perform waveform reconstruction on the initial signal by a method of digital low-pass filtering. In some applications, the reconstructed waveform may be used to implement advanced measurements.

The measurement module 250 may also include a gain measurement module. Gain refers to the gain of the photoelectric sensor. Exemplarily, the gain measurement module may calculate the energy of dark events occurring in the photoelectric sensor based on the comparison signal and/or the digital signal, generate an energy spectrogram of the dark events, and calculate the gain of the photoelectric sensor based on the energy spectrogram. The gain (or gain and crosstalk rate) of the photoelectric sensor (particularly SiPM) is related to the temperature and a bias voltage applied to the photoelectric sensor. When the photoelectric sensor is operating normally, the bias voltage is usually unchanged, so its gain (or gain and crosstalk rate) is mainly affected by the temperature. Taking SiPM as an example, when the temperature increases, the gain (or gain and crosstalk rate) of the SiPM decreases, and the number of dark events (magnitude of dark current) per unit time increases. Therefore, the gain change of the SiPM may be determined by detecting the energy of a single dark event.

According to another aspect of the present disclosure, a photon measurement device is provided. The photon measurement device includes a scintillator, a photoelectric sensor, and the above-mentioned apparatus 200 for measuring photon information.

When the apparatus 200 for measuring photon information is described above in conjunction with FIGS. 2-4, the circuit structure and working principle of the scintillator, the photoelectric sensor and the apparatus 200 are described. Those skilled in the art can understand the implementations of the photon measurement device according to the above descriptions, and details are not described herein again.

The photon measurement device may be a positron emission tomography (PET) device, a single photon emission computed tomography (SPECT) device, or the like. Compared to the existing photon measurement device such as a PET device, the photon measurement devices provided by the embodiments of the present disclosure is low in cost and high in time measurement accuracy, and therefore, have greatest application value and market prospect.

The above FPGA is used as an example to illustrate the specific implementations of the invention. It is noted that the FPGA is not a necessary component for the construction of the invention. The functional modules of the invention realized by use of the FPGA may also be realized by digital circuits formed by discrete components, for example a digital signal processor (DSP), a complex programmable logic device (CPLD), a micro control unit (MCU) or a central processing unit (CPU), and so on.

Although the principle and application of the present invention are described by using SiPM as an example, it should be understood that the present invention is not limited to this. The apparatus for measuring photon information provided by the present invention can also be applied to PMT or any other suitable photoelectric sensor.

It should be noted that in the claims, any reference signs located between parentheses should not be constructed as limitations on the claims. The word "comprising" does not exclude the presence of elements or steps not listed in the claims. The word "a" or "an" preceding an element does not exclude the presence of multiple such elements. The invention can be implemented by means of hardware comprising several different elements and by means of a suitably programmed computer. In the unit claims enumerating several modules, several of these modules may be embodied in the same hardware. The use of the words "first", "second", and "third" etc. do not indicate order. These words can be interpreted as parts of a names.

The invention has been described with reference to the above embodiments. However, it can be understood that the above embodiments are for illustrative purposes only and are not intended to limit the invention to the scope of the described embodiments. Moreover, it can be understood by those skilled in the art that, the invention is not limited to the above embodiments, more variants and modifications may be made in accordance with the teaching for the invention, and the variants and modifications are all within the scope claimed in the invention. The protection scopes of the disclosure are defined by the accompanying claims.

What is claimed is:

1. An apparatus for measuring photon information, comprising a signal conversion module, an integral comparison module, a transmission control module, a negative feedback module, and a measurement module, wherein
    the signal conversion module is configured to connect to a photoelectric sensor and convert an initial signal outputted by the photoelectric sensor into a converted signal in a voltage form;
    the integral comparison module is connected to an output of the negative feedback module and the signal conversion module and is configured to connect to the photoelectric sensor, and the integral comparison module is configured to integrate a difference between the initial signal and a feedback signal from the negative feedback module, and to generate a comparison signal based on a magnitude relationship between a reference level and a combination result of an integral signal and the converted signal, wherein the integral signal is a signal for representing an integral of the difference between the initial signal and the feedback signal;
    an input of the transmission control module is connected to an output of the integral comparison module, and the transmission control module is configured to control the comparison signal to be transmit based on a clock signal to output a digital signal, wherein a high level in the digital signal and with a duration equal to the cycle of the clock signal represents a first logic level, a low level in the digital signal and with a duration equal to the cycle of the clock signal represents a second logic level;

an input of the negative feedback module is connected to an output of the transmission control module, and the negative feedback module is configured to convert the digital signal into the feedback signal and feed the feedback signal back to the integral comparison module; and an input of the measurement module is connected to the output of the integral comparison module and/or the output of the transmission control module, and the measurement module is configured to determine, based on the comparison signal and/or the digital signal, an arrival time of a high-energy photon detected by the photoelectric sensor.

2. The apparatus according to claim 1, wherein the integral comparison module comprises an integral module and a comparator, the signal conversion module is further configured to generate a first converted signal based on the initial signal and/or generate a second converted signal based on the initial signal, an input of the integral module is connected to the output of the negative feedback module and is configured to connect to the photoelectric sensor, an output of the integral module is connected to a first input of the comparator or connected to an input of an additional module if the integral comparison module comprises the additional module, the integral module is configured to integrate the difference between the initial signal and the feedback signal, an output of the additional module is connected to the first input of the comparator, and the additional module is configured to perform additional processing on a signal outputted by the integral module and output a processed signal;

the comparator is configured to compare a first input signal received from the first input with a second input signal received from the second input to generate the comparison signal, wherein the first input signal is $C_a*V_a+C_{b1}*V_{b1}$, wherein $V_a$ is the integral signal, $C_a$ is an amplification coefficient of $V_a$, $V_{b1}$ is the first converted signal, $C_{b1}$ is an amplification coefficient of $V_{b1}$, $C_a$ is not equal to 0, $C_{b1}*V_{b1}$ and $C_a*V_a$ have same polarity;

the second input signal is $C_{b2}*V_{b2}+V_r$, wherein $V_{b2}$ is the second converted signal, $C_{b2}$ is an amplification coefficient of $V_{b2}$, $V_r$ is the reference level, $C_{b2}$ and $C_{b1}$ are not 0 at the same time, $C_{b2}*V_{b2}$ and $C_a*V_a$ have inverted polarity; and the combination result is $C_a*V_a+C_{b1}*V_{b1}-C_{b2}*V_{b2}$.

3. The apparatus according to claim 2, wherein the integral module comprises an operational amplifier, wherein an inverting input of the operational amplifier is connected to the output of the negative feedback module and is configured to connect to the photoelectric sensor;

an output of the signal conversion module is connected to a non-inverting input of the operation amplifier and/or the inverting input of the operational amplifier, and the signal conversion module is configured to output the first converted signal to the non-inverting input of the operational amplifier and/or output the second converted signal to the inverting input of the operational amplifier.

4. The apparatus according to claim 3, wherein the second input of the comparator is configured to receive the reference level as the second input signal.

5. The apparatus according to claim 2, wherein the additional module comprises a first summation module, an input of the first summation module is connected to the output of the integral module and the output of the signal conversion module, and the first summation module is configured to sum an integral output signal outputted by the integral module and the first converted signal and generate a first summation signal, wherein the integral output signal is $V_a+C_x V_{b1}$, $C_x$ is an amplification coefficient for amplifying $V_{b1}$ by the integral module, and $C_x \geq 0$; and the first input of the comparator is connected to an output of the first summation module, and the first summation signal is the first input signal.

6. The apparatus according to claim 5, wherein the first summation module is implemented by a passive summation circuit, a non-inverting summation circuit or an inverting summation circuit.

7. The apparatus according to claim 2, wherein the reference level is a ground level, wherein the second input of the comparator is connected to an output of the signal conversion module, and the second input is configured to receive the second converted signal as the second input signal.

8. The apparatus according to claim 2, wherein the integral comparison module further comprises a second summation module, an input of the second summation module is connected to an output of the signal conversion module and is configured to receive a primary electrical level, and the second summation module is configured to sum the second converted signal and the primary electrical level and generate a second summation signal, wherein the reference level Vr is Cri*Vri, Vri is the primary electrical level, and Cri is an amplification coefficient for amplifying the primary electrical level by the second summation module; and the second input of the comparator is connected to an output of the second summation module, and the second input is configured to receive the second summation signal as the second input signal.

9. The apparatus according to claim 8, wherein the second summation module is implemented by a passive summation circuit, a non-inverting summation circuit or an inverting summation circuit.

10. The apparatus according to claim 2, wherein the signal conversion module comprises a first conversion module and/or a second conversion module, and the first conversion module and the second conversion module are respectively configured to generate the first converted signal and the second converted signal.

11. The apparatus according to claim 10, wherein the first conversion module comprises a first primary conversion module and a first differential module, wherein the first primary conversion module is configured to convert the initial signal into a first primary signal in the voltage form; and the first differential module is configured to differentiate the first primary signal to obtain the first converted signal.

12. The apparatus according to claim 10, wherein the second conversion module comprises a second primary conversion module and a second differential module, wherein the second primary conversion module is configured to convert the initial signal into a second primary signal in the voltage form; and the second differential module is configured to differentiate the second primary signal to obtain the second converted signal.

13. The apparatus according to claim 1, wherein the measurement module is configured to determine the arrival time in the following way:

determining an occurrence time of a valid event according to an appearance rule of high levels and low levels in the comparison signal and/or the digital signal, and determining the arrival time according to an appearance time of a first high level or a first low level in the comparison signal within the occurrence time of the valid event and/or an appearance time of a first high level or a first low level in the digital signal within the occurrence time of the valid event.

14. The apparatus according to claim 1, wherein the measurement module is further configured to estimate a time drift based on the comparison signal and/or the digital signal and correct the arrival time based on the time drift.

15. The apparatus according to claim 1, wherein the measurement module is further configured to perform one or more of energy measurement, dark current measurement, waveform measurement and gain measurement of the high-energy photon based on the comparison signal and/or the digital signal.

16. A photon measurement device, comprising a scintillator, a photoelectric sensor, and the apparatus for measuring photon information according to claim 1.

* * * * *